(12) United States Patent
Kleihorst et al.

(10) Patent No.: US 6,498,815 B2
(45) Date of Patent: Dec. 24, 2002

(54) METHOD AND ARRANGEMENT FOR VIDEO CODING

(75) Inventors: Richard P. Kleihorst, Eindhoven (NL); Fabrice Cabrera, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 13 days.

(21) Appl. No.: 09/246,663

(22) Filed: Feb. 5, 1999

(65) Prior Publication Data

US 2002/0085630 A1 Jul. 4, 2002

(30) Foreign Application Priority Data

Feb. 13, 1998 (EP) ............................... 98200449

(51) Int. Cl.$^7$ ................. H04N 7/12; H04N 11/02; H04N 11/04
(52) U.S. Cl. ................. 375/240.2; 375/240.16
(58) Field of Search ............... 348/400.1, 401, 348/402, 403, 412, 415; 375/240.2, 240.03, 240.11, 240.16, 240.24; 382/238, 250; 708/402; H04N 7/12, 11/02, 11/04

(56) References Cited

U.S. PATENT DOCUMENTS

| | | | | |
|---|---|---|---|---|
| 4,245,248 A | * | 1/1981 | Netravali et al. | 348/400.1 |
| 4,704,628 A | * | 11/1987 | Chen et al. | 348/400.1 |
| 4,837,617 A | * | 6/1989 | Brusewitz | 348/400.1 |
| 5,072,293 A | | 12/1991 | De Haan et al. | 358/105 |
| 5,408,274 A | | 4/1995 | Chang et al. | 348/700 |
| 5,412,431 A | * | 5/1995 | Vogel | 375/240.03 |
| 5,712,809 A | * | 1/1998 | Girod et al. | 708/402 |
| 5,790,686 A | * | 8/1998 | Koc et al. | 382/250 |
| 5,917,609 A | * | 6/1999 | Breeuwer et al. | 382/238 |

OTHER PUBLICATIONS

DCT–Based Subpixel Motion Compensation And Fully DCT–Based Video Coder; Ut–Va Koc and K. J. Ray Liu; IEEE pp. 598–601, Jul. 1997.*

Digital Signal Processing Laboratory (DSPLAB) houses the DSP Research Group led by Dr. K.J. Ray Liu in affiliation with the Institute for Systems Research (ISR) and the Department of Electrical Engineering (EE).

"Motion Estimation in DCT Domain" by Mingzhou Song, Anni Cai, Member, IEEE and Jing–ao Sun, Member, IEEE, Motion Estimation in DCT Domain, International Conference on Communication Technology, Beijing, China, May 5–7, 1996, pp. 670–674.

"sub–pixel motion estimation with 3–D recursive search block–matching" by Gerard de Haa, Paul W.A.C. Biezen, in Signal Processing Image Communication, vol. 6, (1994), pp. 229–239.

* cited by examiner

Primary Examiner—Nhon Diep
(74) Attorney, Agent, or Firm—Russell Gross

(57) ABSTRACT

A hybrid video encoder which carries out motion estimation and compensation (8) in the transform domain. In such an encoder, the calculation of a prediction block (Ŷ) from previously encoded blocks (Z) stored in the transform-domain frame memory (7) requires a large number of multiplications. This applies particularly to the motion estimation algorithm. In accordance with the invention, only a few DCT coefficients of candidate prediction blocks are calculated, for example, the DC coefficient and some AC coefficients. In a preferred embodiment, the AC coefficients are adaptively selected in dependence upon the motion vector which is being considered. The calculated coefficients of the candidate prediction blocks and the corresponding coefficients of the current input picture block (Y) are then compared to identify the best-matching prediction block.

7 Claims, 3 Drawing Sheets

METHOD AND ARRANGEMENT FOR VIDEO CODING

BACKGROUND OF THE INVENTION

1. Field of the Invention

The invention relates to a method of coding video pictures, comprising the steps of transforming picture blocks of a video picture into transform coefficients, and encoding the difference between the transform coefficients of each transformed picture block and corresponding transform coefficients of a prediction block which is obtained by applying motion estimation to a previously encoded picture. The invention also relates to an arrangement for carrying out the method.

2. Description of the Related Art

Video encoders operating in accordance with international coding standards such as MPEG and H.261 are hybrid encoders, in which transform coding and predictive coding are combined. The predictive coding, which includes motion estimation and compensation, is usually carried out in the pixel domain, and the transform coding (DCT) is applied to the predictively coded signal. In such encoders, an inverse DCT is required in the prediction loop.

Nowadays, research effort is being spent on carrying out the predictive coding in the transform domain. In such an embodiment of the hybrid encoder, the picture is transformed first and the predictive coding is then applied to the transform coefficients. The inverse DCT can now be dispensed with. A schematic diagram of such a hybrid video encoder has been published by the University of Maryland on the Internet (http://dspserv.eng.umd.edu:80..\~koc\/project/Video_Coding.html).

A drawback of the prior-art hybrid video encoder is that motion estimation and compensation in the transform domain are more complex than in the pixel domain because the calculation of a prediction block involves a large number of matrix multiplications. In particular, motion estimation is a severe problem. Motion estimation comprises the steps of calculating a plurality of candidate prediction blocks, comparing each candidate prediction block with the transformed picture block, and selecting one of the candidate prediction blocks to be the prediction block. With each plurality of candidate prediction blocks, said large number of calculations is involved.

It is an object of the invention to provide a method of video encoding, alleviating the above mentioned drawbacks.

To achieve these and other objects, the method in accordance with the invention is characterized in that the steps of calculating a candidate prediction block and comparing the candidate prediction block with the transformed picture block, are carried out for a subset of the transform coefficients of said candidate prediction block and transformed picture block.

The invention is based on the recognition that the majority of bits for encoding a picture block are usually spent on a few transform coefficients and that it is beneficial to restrict the search for the most-resembling prediction block to these coefficients. The number of multiplications is considerably reduced thereby, in particular, in coding standards such as MPEG, where motion compensation is applied to 16*16 macroblocks comprising four 8*8 luminance blocks. Note that the eventually selected prediction block for the motion compensation will still be calculated completely. Picture quality is thus not affected.

Advantageously, the subset of transform coefficients comprises the DC coefficient and a predetermined number of adjacent AC coefficients, for example, the coefficients constituting a 2*2 or 3*3 submatrix in the upper left corner of an 8*8 block. The submatrix may extend in the horizontal direction (for example, 2*3 or 2*4) because most of the motion in normal video scenes is found to be horizontal. The number of multiplications is even further reduced when only coefficients of a single row or single column are calculated.

In a preferred embodiment, the coefficients are chosen in dependence upon the represented by the candidate prediction block and expressed by its associated candidate motion vector. If the candidate motion vector represents horizontal motion, a submatrix is chosen which substantially extends in the horizontal direction. If the candidate motion vector represents vertical motion, the submatrix chosen substantially extends in the vertical direction.

DESCRIPTION OF THE PREFERRED EMBODIMENTS

Figure 1:
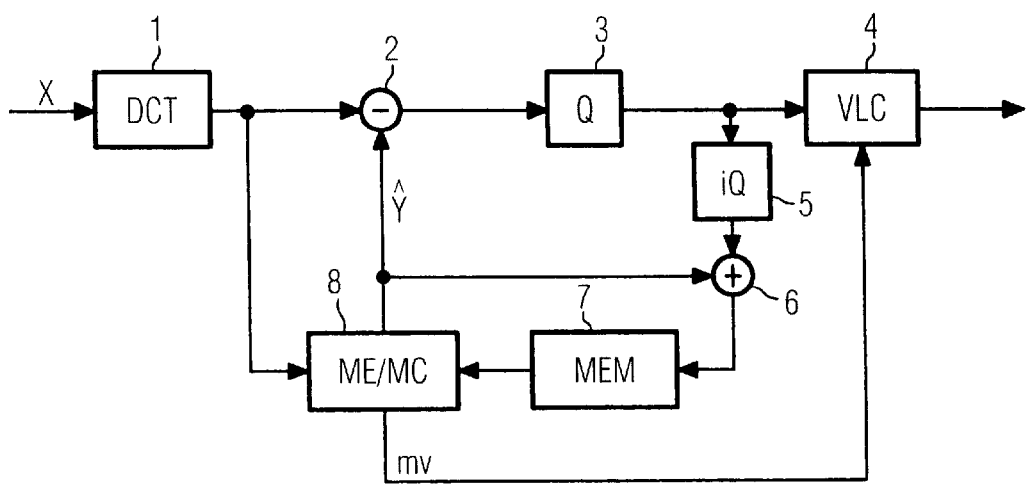
FIG. 1 shows a hybrid encoder carrying out motion estimation in the transform domain in accordance with the invention.

FIG. 1 shows a hybrid encoder carrying out motion estimation in the transform domain in accordance with the invention. The encoder receives a video picture signal in the form of picture blocks X of 8*8 pixels. Each pixel block is transformed by a discrete cosine transform circuit 1 into a block Y of 8*8 DCT coefficients. In a subtracter 2, the coefficients of a prediction block Y are subtracted from the corresponding coefficients of block Y to obtain a block of 8*8 difference coefficients. The difference coefficients are quantized in a quantizer 3 and the quantized difference coefficients are then encoded into variable-length code words by a variable-length encoder 4. The variable-length code words constitute the digital output bitstream of the hybrid encoder. This bitstream is applied to a transmission channel or stored on a storage medium (not shown).

In a prediction loop, the quantized difference coefficients are subjected to inverse quantization in an inverse quantizer 5, added to the current prediction block by an adder 6, and written into in a frame memory 7 to update the previously encoded picture stored therein. The picture blocks stored in frame memory 7 are denoted Z. Note that they are stored in the transform domain. A motion estimator and motion compensator circuit 8 receives the current picture block and searches in the frame memory 7 the prediction block Ŷ which most resembles said picture block. The position of the prediction block thus found is identified by a motion vector mv which defines the position of the prediction block with respect to the current block position. The motion vector mv is applied to the variable-length encoder 4 and is part of the output bitstream.

Figure 2:
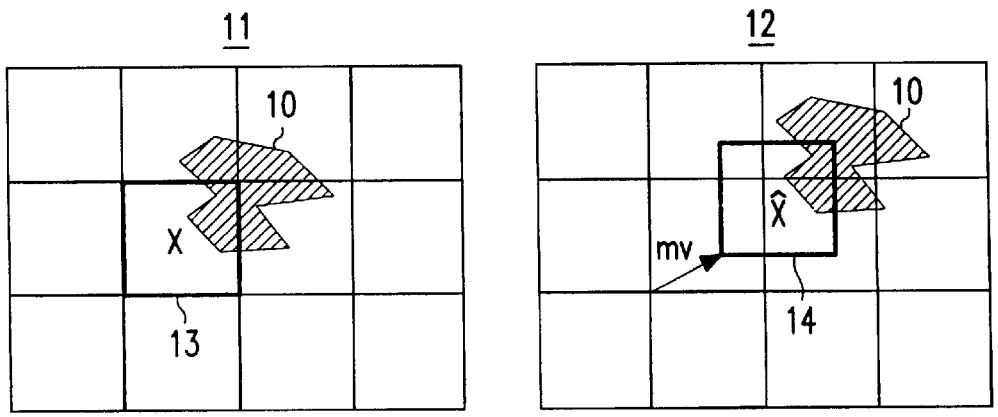
FIG. 2 shows two phases of a moving object in the pixel domain.

In the past, motion compensation used to be carried out in the pixel domain. This is shown by way of example, in FIG. 2 which shows two phases of a moving object 10 in the pixel domain. In the Figure, a picture segment 11, comprising twelve 8*8 pixel blocks of the picture to be coded and a corresponding picture segment 12 of the previously encoded picture stored in a frame memory are shown. Reference numeral 13 denotes an 8*8 pixel block X to be coded and reference numeral 14 denotes the most-resembling prediction block $\hat{X}$ in the frame memory. Also shown is the motion vector mv associated with the prediction block $\hat{X}$. Once this motion vector has been found by motion estimation, the prediction block can easily be obtained by reading the relevant pixels of prediction block $\hat{X}$ from the frame memory.

Figure 3:
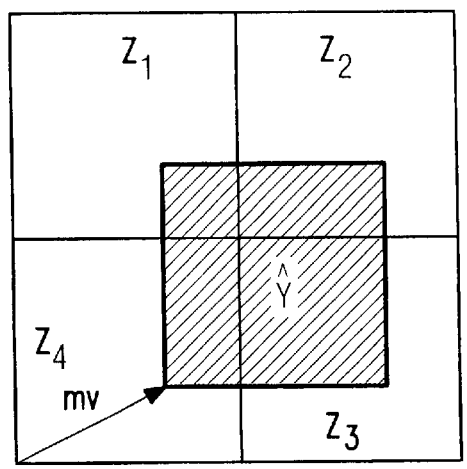
FIG. 3 shows an example of the relative position of a prediction block with respect to previously encoded blocks in the transform domain.

In contrast therewith, the hybrid decoder shown in FIG. 1 stores the previously encoded picture in the transform domain. The coefficients of the prediction block $\hat{Y}$ must now be calculated from coefficient blocks Z stored in the memory. This is shown, by way of example, in FIG. 3 which shows that the coefficients of a prediction block $\hat{Y}$ are to be calculated from four underlying coefficient blocks $Z_1$, $Z_2$, $Z_3$ and $Z_4$. In mathematical notation, the prediction block follows from the equation:

$$\hat{Y} = \sum_{i=1}^{4} H_i Z_i W_i \quad (1)$$

where $H_i$ and $W_i$ are transform matrices representing the relative position of the block $\hat{Y}$ with respect to the underlying blocks. $H_i$ and $W_i$ have one of the formats $$\begin{pmatrix} 0 & 0 \\ I & 0 \end{pmatrix} \text{ and } \begin{pmatrix} 0 & I \\ 0 & 0 \end{pmatrix}$$

and
where I is an identity matrix and 0 is a matrix of zeroes. A theoretical background of equation (1) can be found, inter alia, in U.S. Pat. No. 5,408,274.

The above calculation of the coefficients of the prediction block presumes knowledge of the matrices $H_i$ and $W_i$, i.e., knowledge of the motion vector mv. It is the purpose of a motion estimator (included in circuit 8 in FIG. 1) to determine the motion vector of the prediction block which most resembles the current input block. Motion estimation is a very complicated process, even in the pixel domain, and much research effort has been spent to find cost-effective and well-performing motion estimation algorithms. In fact, motion estimation is an iterative process of applying motion compensation to a plurality of candidate prediction blocks and selecting an optimal prediction block from said candidates. Hereinafter, an algorithm known as 3-Dimensional Recursive Search (3DRS) block matching algorithm will be referred to by way of example. This algorithm is disclosed, inter alia, in Applicant's U.S. Pat. No. 5,072,293. A pleasant property of the 3DRS motion estimation algorithm is that only a restricted number of candidate motion vectors are to be evaluated.

In view of the recognition that motion estimation is similar to repeatedly applying motion compensation to a plurality of candidate prediction blocks, motion estimation in the transform domain requires equation (1) to be calculated several times. This requires a large number of multiplications. In accordance with the invention, the calculation of each candidate prediction block in accordance with equation (1) is carried out for a restricted number of coefficients only. This reduces the number of multiplications so dramatically that a one-chip MPEG2 encoder operating in the transform domain becomes feasible. Needless to say that this a great step in the field of digital video processing.

Figure 4A:
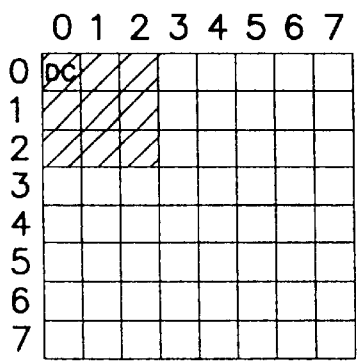
FIGS. 4A–4C and 5A–5D show examples of subsets of coefficients selected for carrying out motion estimation.
Figure 4B:
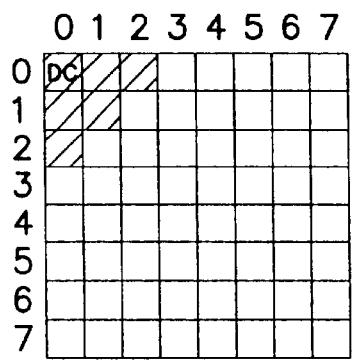
Figure 4C:
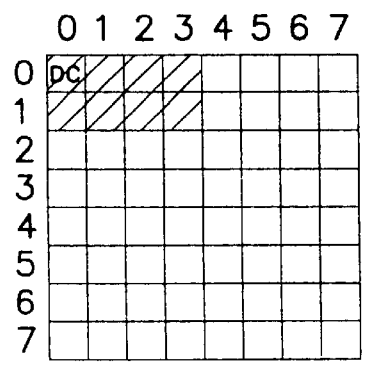

The coefficients to be calculated for the purpose of motion estimation can be fixedly chosen. Preferably, they include the DC coefficient and a few AC coefficients representing lower spatial frequencies. That is because these coefficients are responsible for the majority of bits in the output signal and are thus most worthwhile to be minimized in the difference block (output of subtracter 2 in FIG. 1). FIGS. 4A–4C show examples of preferred choices. In each example, the upper-left coefficient is the DC coefficient. In FIG. 4A, the coefficients constitute a 3*3 (or any other size) submatrix. In FIG. 4B, the selected coefficients are the first coefficients of a zigzag scanned series. This choice is advantageous in view of already available circuits for zigzag scanning coefficient blocks. In FIG. 4C, the submatrix extends in the horizontal direction. The latter choice benefits from the property that most of the motion found in plain video scenes is horizontal motion.

In a preferred embodiment of the invention, the coefficients to be calculated for the purpose of motion estimation are adaptively chosen in dependence upon the candidate motion vectors which are being evaluated. If the candidate motion vectors represent horizontal motion (which in the 3DRS algorithm is the case if substantially horizontal motion has been found previously), a submatrix is chosen which extends in the horizontal direction.

Figure 5A:
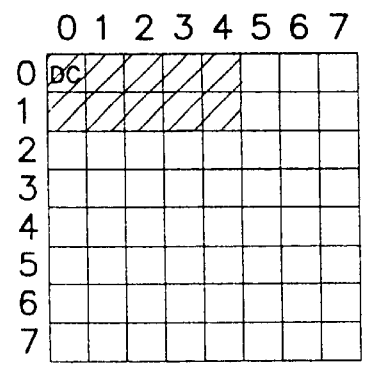
Figure 5B:
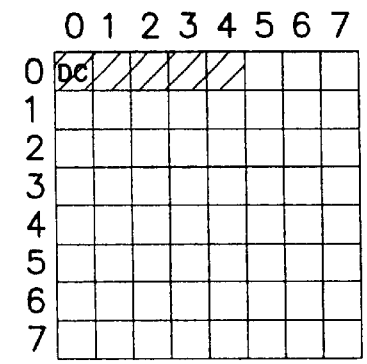
Figure 5C:
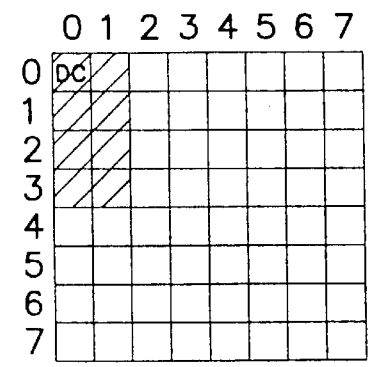

Examples thereof are shown in FIGS. 5A and 5B. If the candidate motion vectors represent vertical motion, the submatrix extends in the vertical direction as shown in FIGS. 5C and SD.

Figure 5D:
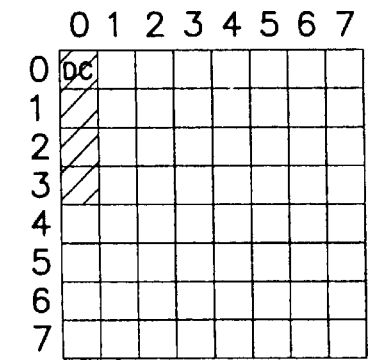

The examples shown in FIGS. 5B and 5D are particularly advantageous because the calculation on of the coefficients of a single row or column drastically contributes to saving the number of multiplications (8 coefficients constituting a single row can more economically be computed than 8 coefficients constituting a 2*4 submatrix). It is further noted that the AC coefficients chosen are not necessarily contiguous to the DC coefficient. Because small amounts of motion become manifest as higher spatial frequencies in the difference block (output of subtracter 2 in FIG. 1), it may also be advantageous to evaluate AC coefficients representing higher spatial frequencies for small amounts of motion.

Figure 6:
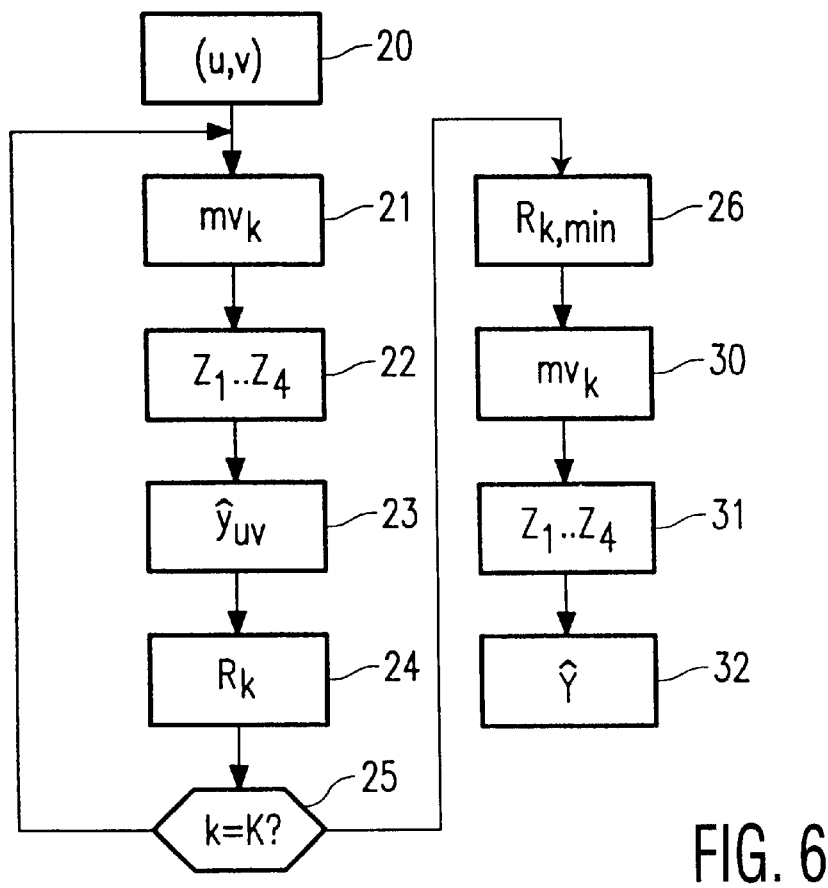
FIG. 6 shows a flowchart illustrating the operations of a motion estimation and compensation circuit which is shown in FIG. 1.

The operation of the motion estimation and motion compensation circuit 8 (FIG. 1) will now be described. Because it has to successively carry out a plurality of identical operations each involving a number of calculations, the circuit is preferably implemented as a microprocessor-controlled arithmetic unit. The architecture of such a unit is well-known to those skilled in the art and therefore not shown in more detail. For the purpose of disclosing the invention, FIG. 6 shows a flowchart of operations which are carried out by the microprocessor controlling the arithmetic unit. It is assumed that the 3DRS motion estimation algorithm is used and that the candidate motion vectors mvk (k=1 . . . K) are known in advance.

In a first step 20, the processor determines which subset of DCT coefficients are taken into account for the motion estimation process. As already discussed above, the set may be fixedly chosen (cf. FIGS. 4A–4C) or adaptively selected in dependence upon the candidate motion vectors (cf. FIGS.

5A–5D). In the step 20, the coefficients are expressed in terms of indexes (u=0 . . . 7, v=0 . . . 7) indicating their positions in the coefficient matrix.

In a step 21, the microprocessor selects one of the candidate motion vectors $mv_k$. Then, in a step 22, the processor retrieves the four coefficient blocks underlying the candidate prediction block associated with this motion vector from the frame memory. In accordance with equation (1), said four blocks are denoted $Z_1 \ldots Z_4$.

In a step 23, the relevant coefficients of the candidate prediction block are calculated in accordance with equation (1). The coefficients are denoted $\hat{y}_{u,v}$. Note that only the coefficients $\hat{y}_{u,v}$ are calculated having an index (u,v) to be taken into account as has been determined in the step 20.

In a step 24, the microprocessor compares the set of coefficients $\hat{y}_{u,v}$ with the corresponding coefficients $\hat{y}_{u,v}$ of the current input block. The result thereof is stored as a resemblance indicator $R_k$ for the current candidate motion vector $mv_k$. In this example, the resemblance indicator is indicative of the mean absolute difference between input block and candidate prediction block in the transform domain:

$$R_k = \sum_{u,v} w_{u,v} |y_{u,v} - \hat{y}_{u,v}|$$

where $w_{u,v}$ is a weighting factor indicating the relative relevance of the respective coefficient. In video compression schemes, such as MPEG, the quantizer matrix provides appropriate weighting factors. In a simple embodiment, all weighting factors $w_{u,v}$ may be set to one.

In a step 25, it is tested whether all candidate motion vectors $mv_k$ (k=1 . . . K) have been processed in this manner. As long as this is not the case, the steps 21-24 are repeated for the other candidate motion vectors $mv_k$. If all candidate motion vector have been processed, the motion estimation process proceeds with a step 26 in which it is determined which of the stored resemblance indicators $R_k$ (k=1 . . . K) has the smallest value. The best-matching one of the candidate prediction blocks has now been identified and the motion estimation process is finished.

The arithmetic unit now proceeds with motion compensation. To this end, the motion vector $mv_k$ of the best-matching prediction block just found is again selected in a step In a step 31, the four underlying blocks $Z_1 \ldots Z_4$ are re-read from the frame memory. In a step 32, all coefficients of the prediction block $\hat{Y}$ are calculated in accordance with equation (1). Note the difference of this step 32 with the alleged similar step 23 in the motion estimation process. In the step 32, all the coefficients are calculated whereas the step 23 applies to a few coefficients only. The block $\hat{Y}$ is applied to the subtracter 2 (see FIG. 1) of the hybrid encoder.

In the above described embodiment, the candidate prediction blocks have the same size as the underlying previously encoded blocks. Some coding standards, such as H.263, provide an option ("advanced motion estimation") to transmit a motion vector for each 8*8 block. The described embodiment can advantageously be implemented in a hybrid encoder in accordance with such a standard. Other coding standards, such as MPEG, transmit one motion vector for each macroblock which includes four 8*8 blocks. For such coding standards, the process of motion estimation and compensation is slightly different, as will now be explained with reference to FIG. 7.

Figure 7:
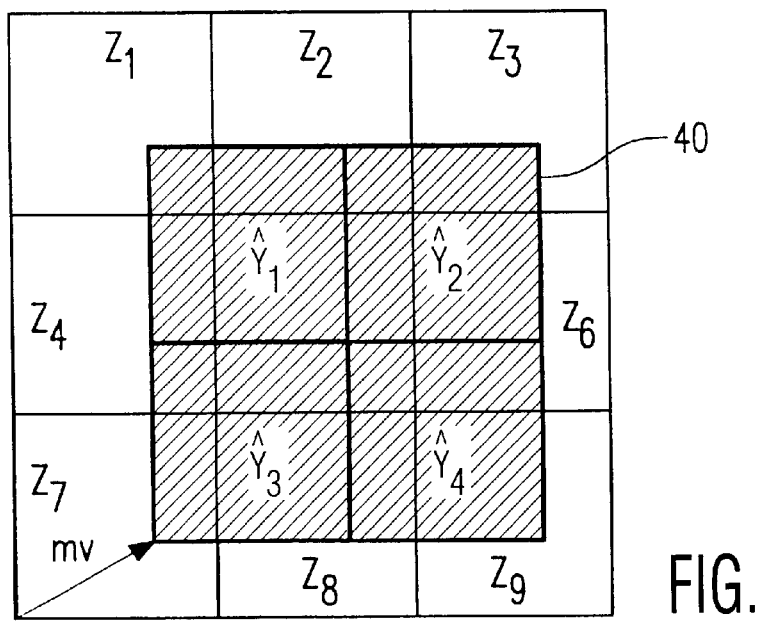
FIG. 7 shows an example of the relative position of a prediction macroblock block with respect to previously encoded blocks in the transform domain.

FIG. 7 shows a (candidate) prediction macroblock 40 comprising four 8*8 blocks $\hat{Y}_1$–$\hat{Y}_4$. The macroblock now covers nine previously encoded coefficient blocks $Z_1$–$Z_9$.

To calculate the coefficients of the macroblock, each 8*8 block is individually calculated from its four underlying blocks in accordance with equation (1). The motion estimation and compensation process further proceeds as described above with reference to FIG. 6. For the purpose of motion compensation, all the coefficients (a total of 4*64 in total) are calculated (step 32). For the purpose of motion estimation, only the selected coefficients are calculated (step 23), and the corresponding coefficients are taken from the input macroblock for determining the resemblance indicator (step 25).

In summary, a hybrid video encoder is disclosed which carries out motion estimation and compensation (8) in the transform domain. In such an encoder, the calculation of a prediction block ($\hat{Y}$) from previously encoded blocks (Z) stored in the transform-domain frame memory (7) requires a large number of multiplications. This applies particularly to the motion estimation algorithm. In accordance with the invention, only a few DCT coefficients of candidate prediction blocks are calculated, for example, the DC coefficient and some AC coefficients. In a preferred embodiment, the AC coefficients are adaptively selected in dependence upon the motion vector which is being considered. The calculated coefficients of the candidate prediction blocks and the corresponding coefficients of the current input picture block (Y) are then compared to identify the best-matching prediction block.

What is claimed is:

1. A method of coding video pictures, comprising the steps:

transforming picture blocks of a video picture into transform coefficients;

applying motion estimation to a previous encoded picture thereby forming a prediction block; and encoding the difference between the transform coefficients of each transformed picture block and corresponding transform coefficients of said prediction block, wherein the motion estimation step comprises the steps:

calculating a plurality of candidate prediction blocks;

comparing each candidate prediction block with the transformed picture block; and selecting one of the candidate prediction blocks to be the prediction block, wherein the steps of calculating a candidate prediction block and comparing the candidate prediction block with the transformed picture block are carried out for a subset of the transform coefficients of said candidate prediction block and transformed picture block;

wherein the subset of transform coefficients is adaptively chosen in dependence upon a candidate motion vector associated with the candidate prediction block.

2. The method as claimed in claim 1, wherein the subset of transform coefficients comprises a DC coefficient and a predetermined number of AC coefficients;

wherein the subset of transform coefficients is adaptively chosen in dependence upon a candidate motion vector associated with the candidate prediction block.

3. The method as claimed in claim 1, wherein the subset of transform coefficients comprises the first N coefficients of the first M rows of the candidate prediction block, N and M being chosen in dependence upon the horizontal and vertical component, respectively, of the candidate motion vector.

4. The method as claimed in claim 3, wherein N=1 for candidate motion vectors having a substantial vertical component, and M=1 for candidate motion vectors having a substantial horizontal component.

5. The method as claimed in claim 1, wherein said step of comparing each candidate prediction block with the transformed prediction block includes comparing spatially corresponding coefficients, predetermined weighting factors being applied to said spatially corresponding coefficients.

6. The method as in claim 1, wherein the candidate prediction blocks are chosen in accordance with a 3-dimensional recursive block matching algorithm.

7. A block-based hybrid video encoder comprising:
   a transform encoder circuit for transforming picture blocks of a video picture into transform coefficient; and
   a predictive encoder comprising:
   a motion estimator for forming a prediction block from a previously encoded picture;
   means for forming a difference between each transformed picture block and said prediction block; and
   means for encoding said difference, wherein the motion estimator comprises:
     means for calculating a plurality of candidate prediction blocks;
     means for comparing each candidate prediction block with the transformed picture block; and
     means for selecting one of the candidate prediction blocks to be the prediction block,
   wherein said calculating means and said comparing means operate on a subset of transform coefficients of said candidate prediction block and transformed picture block;
   wherein the subset of transform coefficients is adaptively chosen in dependence upon a candidate motion vector associated with the candidate prediction block.

* * * * *